(12) United States Patent
Bailey

(10) Patent No.: US 9,218,785 B2
(45) Date of Patent: Dec. 22, 2015

(54) LIGHTING CORRECTION FILTERS

(71) Applicant: DreamWorks Animation LLC, Glendale, CA (US)

(72) Inventor: Stephen Bailey, Glendale, CA (US)

(73) Assignee: DreamWorks Animation LLC, Glendale, CA (US)

( * ) Notice: Subject to any disclaimer, the term of this patent is extended or adjusted under 35 U.S.C. 154(b) by 162 days.

(21) Appl. No.: 13/844,016

(22) Filed: Mar. 15, 2013

(65) Prior Publication Data
US 2014/0267354 A1 Sep. 18, 2014

(51) Int. Cl.
*G06T 15/50* (2011.01)
*G09G 5/10* (2006.01)
*G06T 19/20* (2011.01)

(52) U.S. Cl.
CPC *G09G 5/10* (2013.01); *G06T 15/50* (2013.01); *G06T 19/20* (2013.01)

(58) Field of Classification Search
CPC ......... G06T 13/00–13/80; G06T 15/50–15/87; G06T 17/005
See application file for complete search history.

(56) References Cited

U.S. PATENT DOCUMENTS

| 4,922,413 | A  | 5/1990  | Stoughton et al. |
| 5,329,360 | A  | 7/1994  | Gillard et al. |
| 5,675,752 | A  | 10/1997 | Scott et al. |
| 5,808,617 | A  | 9/1998  | Kenworthy et al. |
| 5,808,625 | A  | 9/1998  | Picott et al. |
| 5,896,139 | A  | 4/1999  | Strauss |
| 5,982,389 | A  | 11/1999 | Guenter et al. |
| 5,986,667 | A  | 11/1999 | Jevans |
| 6,154,215 | A  | 11/2000 | Hopcroft et al. |
| 6,243,856 | B1 | 6/2001  | Meyer et al. |
| 6,252,608 | B1 | 6/2001  | Snyder et al. |
| 6,263,103 | B1 | 7/2001  | Freeman et al. |
| 6,272,650 | B1 | 8/2001  | Meyer et al. |
| 6,496,190 | B1 | 12/2002 | Driemeyer et al. |
| 6,556,200 | B1 | 4/2003  | Pfister et al. |

(Continued)

FOREIGN PATENT DOCUMENTS

| EP | 1918880 A2 | 5/2008 |
| EP | 1918881 A2 | 5/2008 |

(Continued)

OTHER PUBLICATIONS

Rossler et al., Dynamic Shader Generation for Flexible Multi-Volume Visualization, IEEE Pacific Visualisation Symposium, Mar. 2008, pp. 17-24.*

(Continued)

*Primary Examiner* — Charles Tseng
(74) *Attorney, Agent, or Firm* — Morrison & Foerster LLP

(57) ABSTRACT

A lighting correction filter for selectively correcting lighting in computer animation is disclosed. The lighting correction filter can select a computer-generated object having one or more lighting attributes. The selected object can be a portion of an object, an entire object, a portion of a computer-generated scene, or an entire scene. The filter can then set lighting correction values for the lighting attributes of the selected object. The lighting correction values can be color values, exposure values, or both. The filter can apply the lighting correction values to the selected object's lighting attributes to effect a lighting correction in the object prior to rendering.

25 Claims, 11 Drawing Sheets
(5 of 11 Drawing Sheet(s) Filed in Color)

(56) References Cited

U.S. PATENT DOCUMENTS

| | | |
|---|---|---|
| 6,611,262 B1 | 8/2003 | Suzuki |
| 6,760,485 B1 * | 7/2004 | Gilman et al. ............... 382/274 |
| 6,919,891 B2 | 7/2005 | Schneider et al. |
| 7,174,039 B2 | 2/2007 | Koo et al. |
| 7,414,626 B1 | 8/2008 | Picott |
| 7,439,982 B2 | 10/2008 | Deniau et al. |
| 7,548,238 B2 | 6/2009 | Berteig et al. |
| 7,911,472 B2 | 3/2011 | Harper |
| 7,920,143 B1 | 4/2011 | Haratsch et al. |
| 8,009,176 B2 | 8/2011 | Zimmer |
| 8,259,110 B1 | 9/2012 | Carr et al. |
| 8,274,506 B1 | 9/2012 | Rees |
| 8,339,402 B2 | 12/2012 | Henson et al. |
| 8,352,397 B2 | 1/2013 | Rubin et al. |
| 8,352,443 B1 | 1/2013 | Polson et al. |
| 8,369,564 B2 | 2/2013 | Hervas et al. |
| 8,612,485 B2 | 12/2013 | Selan et al. |
| 8,624,898 B1 | 1/2014 | Bugaj et al. |
| 8,773,433 B1 * | 7/2014 | Smyrl ............... 345/426 |
| 2001/0027388 A1 | 10/2001 | Beverina et al. |
| 2002/0063704 A1 | 5/2002 | Sowizral et al. |
| 2002/0099684 A1 | 7/2002 | Ardoin et al. |
| 2002/0128841 A1 | 9/2002 | Kibre et al. |
| 2002/0140707 A1 | 10/2002 | Samra et al. |
| 2002/0163518 A1 | 11/2002 | Rising, III et al. |
| 2002/0188613 A1 | 12/2002 | Chakraborty et al. |
| 2003/0156117 A1 | 8/2003 | Higuchi et al. |
| 2004/0052450 A1 | 3/2004 | Morrison |
| 2004/0109501 A1 | 6/2004 | Wollborn |
| 2004/0160445 A1 | 8/2004 | Whatmough |
| 2004/0189668 A1 | 9/2004 | Beda et al. |
| 2004/0194020 A1 | 9/2004 | Beda et al. |
| 2004/0222989 A1 | 11/2004 | Zhang et al. |
| 2004/0222992 A1 | 11/2004 | Calkins et al. |
| 2005/0039176 A1 | 2/2005 | Fournie |
| 2005/0110790 A1 | 5/2005 | D'Amora |
| 2005/0140694 A1 | 6/2005 | Subramanian et al. |
| 2005/0256950 A1 | 11/2005 | Suzuki |
| 2005/0262470 A1 | 11/2005 | Gavrilov |
| 2006/0176403 A1 | 8/2006 | Gritton et al. |
| 2007/0080964 A1 | 4/2007 | Kainz et al. |
| 2007/0176926 A1 | 8/2007 | Garcia et al. |
| 2007/0185881 A1 | 8/2007 | Vienneau et al. |
| 2008/0028414 A1 | 1/2008 | Couture-Gagnon et al. |
| 2008/0049033 A1 | 2/2008 | Yang |
| 2008/0117216 A1 | 5/2008 | Dorie |
| 2008/0122838 A1 | 5/2008 | Hoover et al. |
| 2008/0231633 A1 | 9/2008 | Keller et al. |
| 2008/0238916 A1 | 10/2008 | Ghosh et al. |
| 2008/0278482 A1 | 11/2008 | Farmanbar et al. |
| 2009/0021513 A1 | 1/2009 | Joshi et al. |
| 2009/0027380 A1 | 1/2009 | Rajan et al. |
| 2010/0079462 A1 | 4/2010 | Breeds et al. |
| 2010/0123723 A1 | 5/2010 | Collard et al. |
| 2010/0134501 A1 | 6/2010 | Lowe et al. |
| 2010/0177104 A1 | 7/2010 | Dufour et al. |
| 2010/0214284 A1 | 8/2010 | Rieffel et al. |
| 2010/0214313 A1 | 8/2010 | Herman et al. |
| 2010/0289804 A1 | 11/2010 | Jackman et al. |
| 2010/0302249 A1 | 12/2010 | Fowler et al. |
| 2010/0322358 A1 | 12/2010 | Drumm et al. |
| 2011/0090236 A1 | 4/2011 | Calsyn et al. |
| 2011/0106843 A1 | 5/2011 | Pan et al. |
| 2011/0181606 A1 | 7/2011 | Sumner et al. |
| 2011/0182479 A1 | 7/2011 | Sese et al. |
| 2011/0206200 A1 | 8/2011 | Sovio et al. |
| 2011/0234587 A1 | 9/2011 | Maigret et al. |
| 2011/0316854 A1 | 12/2011 | Vandrovec |
| 2012/0095745 A1 | 4/2012 | Le Guevel-Scholtens et al. |
| 2012/0113125 A1 | 5/2012 | Guerrab et al. |
| 2012/0166446 A1 | 6/2012 | Bowman et al. |
| 2012/0280991 A1 | 11/2012 | Maloney et al. |
| 2012/0280995 A1 | 11/2012 | Anderson |
| 2012/0284664 A1 | 11/2012 | Zhao |
| 2013/0090850 A1 | 4/2013 | Mays |
| 2013/0120421 A1 | 5/2013 | Maguire |
| 2013/0120422 A1 | 5/2013 | Rao et al. |
| 2013/0127891 A1 | 5/2013 | Kim et al. |
| 2014/0035908 A1 | 2/2014 | Powell et al. |
| 2014/0059564 A1 | 2/2014 | Vigneras et al. |
| 2014/0108485 A1 | 4/2014 | Geibel et al. |

FOREIGN PATENT DOCUMENTS

| | | |
|---|---|---|
| EP | 2779100 A1 | 9/2014 |
| WO | 01/63561 A1 | 8/2001 |
| WO | 2007/146800 A2 | 12/2007 |
| WO | 2007146800 A3 | 11/2008 |
| WO | 2012/174128 A1 | 12/2012 |

OTHER PUBLICATIONS

Non Final Office Action received for U.S. Appl. No. 13/843,695, mailed on Oct. 22, 2014, 16 pages.
Non Final Office Action received for U.S. Appl. No. 13/844,424, mailed on Oct. 28, 2014, 10 pages.
Barrett et al., "A Monotonic Superclass Linearization for Dylan", Oopsla 96, Jun. 28, 1996, pp. 69-82.
International Search Report and Written Opinion received for PCT Patent Application No. PCT/US2014/026792, mailed on Aug. 11, 2014, 7 pages.
International Search Report & Written Opinion received for PCT Patent Application No. PCT/US2014/026799, mailed on Sep. 26, 2014, 11 pages.
"Intro to Animation", Power Point Presentation, available online at <http://visservices.sdsc.edu/courses/maya/spring06/introtoanim.ppt>, accessed on Apr. 30, 2013, 32 pages.
"JUNG (Java Universal Network/Graph) Framework Manual, Filtering", available online at <http://jung.sourceforge.net/doc/manual.html#filter>, retrieved on Apr. 30, 2013, 13 pages.
"WebKit Coordinated Graphics System", available online at <http://trac.webkit.org/wiki/CoordinatedGraphicsSystem>, retrieved on Apr. 30, 2013, 9 pages.
Carstarphen, John, "Lighting Effects in Cinema 4D Animation", available online at <http://www.ehow.com/video_4444919_lighting-effects-cinema-4d-animation.html>, retrieved on Apr. 30, 2013, 2 pages.
Illinois Simulator Lab, "Syzygy Documentation: Programming and Application Frameworks", available online at <http://syzygy.isl.uiuc.edu/szg/doc/Programming.html>, retrieved on Apr. 30, 2013, Dec. 17, 2012, 11 pages.
Lu et al., "Knowledge-Based Digital Media Processing: Generic Object Registration using Multiple Hypotheses Testing in Partition Trees", IEE Proc.-Vis. Image Signal Process, vol. 153, No. 3, Jun. 2006, pp. 323-330.
Oishi et al., "Parallel Alignment of a Large Number of Range Images", Proceedings of the Fourth International Conference on 3-D Digital Imaging and Modeling (3DIM'03), IEEE Computer Society, 2003, 8 pages.
Techfuels, "The Lighting Scene in 3D Animation", available online at <http://www.techfuels.com/applications/9895-lighting-scene-3d-animation.html>, retrieved on Apr. 30, 2013, 3 pages.
Toon Boom Animation, "Lighting Effects", available online at <http://beta.toonboom.com/home-users/toon-boom-studio/resources/tips-and-tricks/lighting-effects>, retrieved on Apr. 30, 2013, 2 pages.
Van Der Beek, Jelle, "Dependency Graphs in Games", Gamasutra The Art & Business of Making Games, available at <http://www.gamasutra.com/view/feature/131221/dependency_graphs_in_games.php?print=1>, accessed on Apr. 30, 2013, 15 pages.
Extended European Search Report received for European Patent Application No. 14160117.9, mailed on May 26, 2014, 7 pages.
Open Inventor Toolkit Tutorial, "Chapter 3. Nodes and Groups and Chapter 4. Cameras and Lights", Available at <http://www-evasion.imag.fr/Membres/Francois.Faure/doc/inventorMentor/sgi_html/ch03.html>, Retrieved on Oct. 18, 2013, 61 pages.
Schmalstieg et al., "Modeling and Rendering of Outdoor Scenes for Distributed Virtual Environments", ACM VRST '97 Lausanne Switzerland, 1997, pp. 209-215.

(56) References Cited

OTHER PUBLICATIONS

Sun Microsystems, "Reusing Scene Graphs", Java 3D API Specification, Available at <http://docs.oracle.com/cd/E17802_01/j2se/javase/technologies/desktop/java3d/forDevelopers/j3dguide/SceneGraphSharing.doc.html>, Jun. 1999, pp. 1-11.

Ex-Parte Quayle Action received for U.S. Appl. No. 13/831,482, mailed on Nov. 24, 2014, 7 pages.

Notice of Allowance received for U.S. Appl. No. 13/831,482, mailed on Mar. 4, 2015, 5 pages.

Non-Final Office Action received for U.S. Appl. No. 13/844,497, mailed on Mar. 13, 2015, 21 pages.

Non-Final Office Action received for U.S. Appl. No. 13/844,380, mailed on Apr. 2, 2015, 9 pages.

Final Office Action received for U.S. Appl. No. 13/844,424, mailed on Apr. 7, 2015, 10 pages.

Wernecke, Josie, "The Inventor Mentor: Programming Object-Oriented 3D Graphics with Open Inventor™ Release 2", Addison-Wesley Publishing Company, Chapter 3. Nodes and Groups, 1994, 20 pages.

Non Final Office Action received for U.S. Appl. No. 13/844,113, mailed on Apr. 10, 2015, 10 pages.

Non-Final Office Action received for U.S. Appl. No. 13/831,482, mailed on Apr. 20, 2015, 8 pages.

Invitation to pay additional fees received for PCT Patent Application No. PCT/US2014/026799, mailed on Jul. 25, 2014, 2 pages.

Final Office Action received for U.S. Appl. No. 13/843,695, mailed on Feb. 23, 2015, 21 pages.

Non Final Office Action received for U.S. Appl. No. 13/843,980, mailed on Feb. 5, 2015, 15 pages.

Non-Final Office Action received for U.S. Appl. No. 13/844,363, mailed on Feb. 24, 2015, 9 pages.

Non-Final Office Action received for U.S. Appl. No. 13/831,309, mailed on Feb. 24, 2015, 8 pages.

Notice of Allowance received for U.S. Appl. No. 13/831,309, mailed on Jul. 21, 2015, 14 pages.

Final Office Action received for U.S. Appl. No. 13/844,363, mailed on Aug. 6, 2015, 12 pages.

Notice of Allowance received for U.S. Appl. No. 13/844,380, mailed on Jul. 17, 2015, 7 pages.

Extended European Search Report (includes Supplementary European Search Report and Search Opinion) received for European Patent Application No. 14160119.5, mailed on Jun. 30, 2015, 11 pages.

"Robocopy.exe Robust File Copy Utility Version XP010", Microsoft Corporation, 2003, pp. 1-35.

"Open Inventor toolkit Tutorial", Chapter 3. Nodes and Groups and Chapter 4. Cameras and Lights, Available online at <http://www-evasion.imag.fr/Membres/Francois.Faure/doc/inventorMentor/sgi_html/ch03.html>, Retrieved on Oct. 18, 2013, 61 pages.

Bederson et al., "Toolkit Design for Interactive Structured Graphics", IEEE Transactions on Software Engineering, vol. 30, No. 8, Aug. 2004, pp. 535-546.

Qi-Cheng et al., "High-Extensible Scene Graph Framework Based on Component Techniques", Journal of Zhejiang University Science A, vol. 7, No. 7, 2006, pp. 1247-1252.

Dobos et al., "3D Revision Control Framework", Web3D, 2012, pp. 121-129.

Dollner et al., "Object-Oriented 3D Modelling, Animation and Interaction", The Journal of Visualization and Computer Animation, vol. 8, 1997, pp. 33-64.

Tobler, Robert F., "Separating Semantics from Rendering: A Scene Graph Based Architecture for Graphics Applications", Visual Computer, vol. 27, 2011, pp. 687-695.

Final Office Action received for U.S. Appl. No. 13/831,309, mailed on Jun. 5, 2015, 8 pages.

\* cited by examiner

LIGHTING CORRECTION FILTERS

BACKGROUND

1. Field

The present disclosure relates to computer-generated animation and, more specifically, to applying lighting correction filters to computer-generated animation to correct lighting therein.

2. Related Art

A computer-generated scene can be created by rendering one or more computer-generated objects to depict the scene. Light sources, materials, textures, and other visual effects can be associated with the objects to create a realistic visual appearance for the scene. A render setup graph can be used to define the objects and their associated visual effects to be rendered. The graph can typically include one or more interconnected nodes associating the objects and their visual effects, where a node wire can pass the objects and visual effects from node to node for processing. Building the render setup graph can typically be the final animation step prior to rendering.

In some instances, the rendered scene can have small areas in which the lighting (or other visual effects) requires correction to provide a more realistic appearance, e.g., to cast a smaller shadow, to have more lighting around the eyes, and the like. Whereas, the remainder of the scene needs no correction. A traditional approach to correct the small areas has been to correct the lighting at issue, re-associate the object with the corrected lighting, update the render setup graph with the new association, and then re-render the scene, this time with the lighting corrected. An alternate approach has been to create a matte for the small areas at issue and apply the matte to the areas during the scene compositing step. However, both approaches waste substantial time and computational resources to redo areas of the scene that needed no correction in order to correct the small areas that did.

Accordingly, there is a need for an efficient way to correct lighting (and other visual effects) in small areas of a computer-generated scene.

SUMMARY

This relates to lighting correction filters in computer animation. The filters can be selectively applied to lighting attributes of a computer-generated object to correct the object's lighting via the render setup graph. In one example, the lighting correction filter can be a color filter, in which the post-illumination color of the object can be corrected. In another example, the lighting correction filter can be an exposure filter, in which the occlusion shading of the object can be corrected. In another example, the lighting correction filter can be coupled to a scoping light, which sets a specific area of the object at which to apply the lighting correction filter.

Several advantages can be realized with a lighting correction filter. An animator or user can selectively apply the filter to discrete, localized areas of the object in the scene without affecting other areas of the object and/or scene. The animator or user can also apply the filter after the object and its lighting attributes have been created, and just prior to rendering, to avoid having to repeat the entire animation process after lighting correction. Additionally, the animator or user can easily incorporate the filter into a render setup graph to couple to object nodes so as to define the lighting correction for the associated objects.

BRIEF DESCRIPTION OF THE FIGURES

The present application can be best understood by reference to the following description taken in conjunction with the accompanying drawing figures, in which like parts may be referred to by like numerals.

The patent or application file contains at least one drawing executed in color. Copies of this patent or patent application publication with color drawing(s) will be provided by the Office upon request and payment of the necessary fee.

DETAILED DESCRIPTION

Figure 1A:
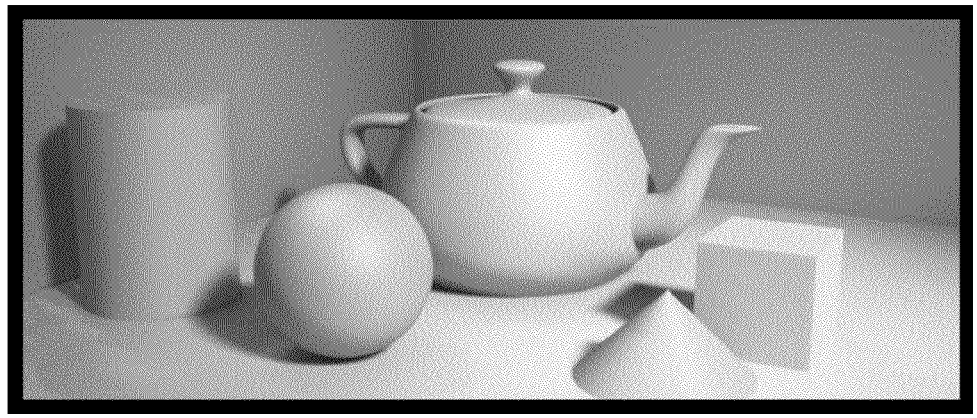
FIGS. 1A through 1D illustrate an exemplary series of rendered scenes that result from applying a lighting correction filter to computer-generated objects in the scenes.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

This relates to a lighting correction filter that can be selectively applied to a computer-generated object prior to rendering to correct the lighting of the object. A computer-generated object can be defined as a surface geometry placed and/or posed within a scene. In one example, the lighting correction filter can be a color filter, in which the post-illumination color of the object is corrected. In another example, the lighting correction filter can be an exposure filter, in which the occlusion shading of the object is corrected. In another example, the lighting correction filter can be coupled to a scoping light, which sets a specific area of the object at which to apply the lighting correction filter.

In implementation, the lighting correction filter can be incorporated into a render setup graph as a node coupled to object nodes and rendering nodes. The object nodes can represent objects and their associated visual effects, including lighting, to be rendered by the rendering nodes. The lighting correction filter node's input can couple to an object node's output to receive the object's lighting attributes. The lighting correction filter node's output can couple to a rendering node's input to pass a function call, with the object's corrected lighting attribute as a call parameter, to the rendering node for rendering the object with corrected lighting. Because the lighting correction filter node couples upstream of the rendering node, lighting correction can be done before the object is ever rendered, unlike traditional lighting correction approaches.

In operation, the lighting correction filter can select a computer-generated object having lighting attributes. The selected object can be a portion of an object, an entire object, a portion of a scene (which includes multiple objects), or an entire scene (which includes all objects). The filter can then set correction values for the lighting attributes of the selected object. The lighting correction values can be color values, exposure values, or both. The filter can apply the lighting correction values to the lighting attributes of the selected object to affect a lighting correction prior to rendering. Optionally, the scoping light can define the area of the selected object at which to apply the filter. The filter can then apply the lighting correction values to the lighting attributes associated with the defined area.

A lighting correction filter can provide several advantages over traditional lighting correction approaches. First, the ability to selectively apply the filter allows an animator or user to correct discrete, localized areas of a computer-generated object without affecting other areas of the object and/or scene. Second, the ability to apply the lighting correction filter after the objects have been created, and just prior to rendering, allows the animator or user to avoid having to repeat the objects' creation, a computationally expensive process, after correcting the lighting. Third, the filter can be easily incorporated into a render setup graph to interconnect with object nodes requiring lighting correction.

Figure 1B:
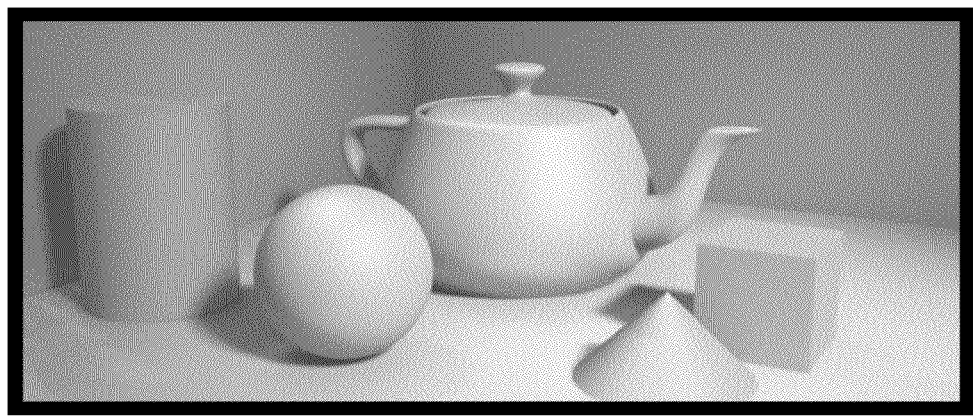
Figure 1C:
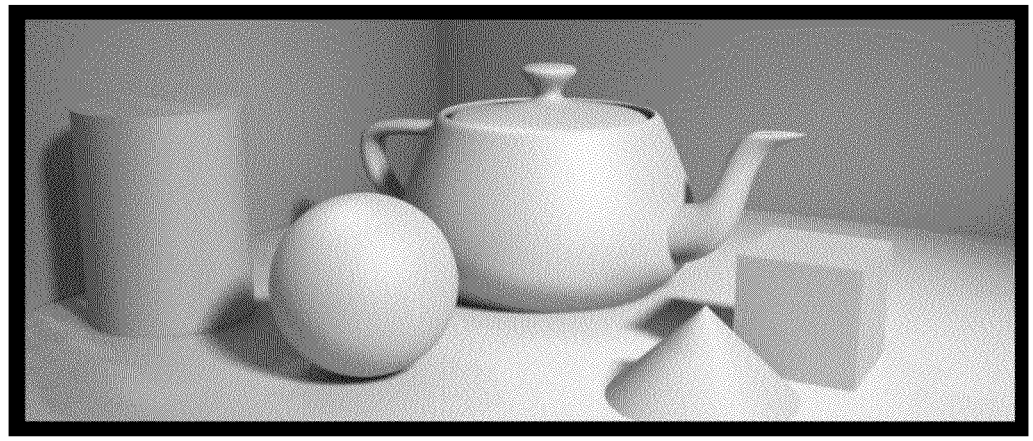
Figure 1D:
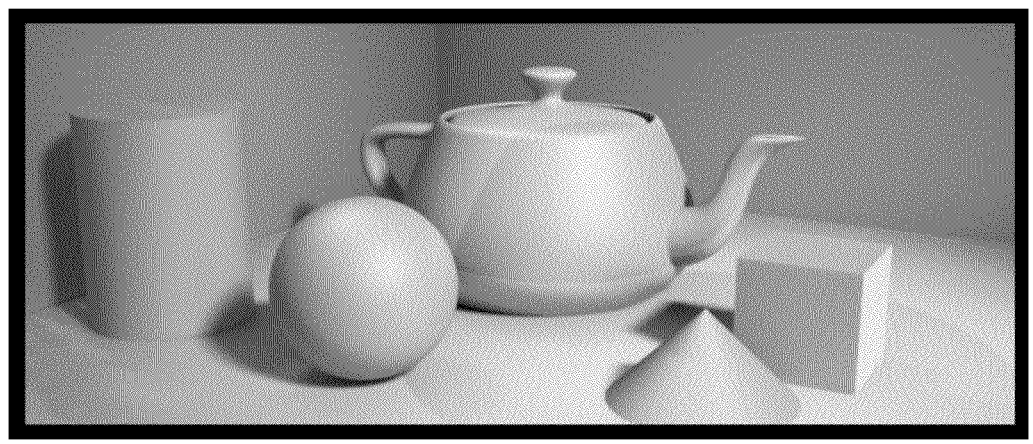

FIGS. 1A through 1D illustrate exemplary scenes from an animation rendered using the method for selectively correcting lighting in the scenes as described in detail below. In FIG. 1A, a computer-generated scene is rendered without any lighting correction. In FIG. 1B, a lighting correction filter is applied to the scene of FIG. 1A to correct the lighting of the entire scene by correcting the scene colors. A comparison between FIGS. 1A and 1B shows the lighting correction made in FIG. 1B implemented as a color correction. In FIG. 1C, a lighting correction filter is applied to select objects in the scene of FIG. 1A, i.e., the cube and the sphere, to correct the lighting of the selected objects by correcting their colors. In FIGS. 1A through 1D, the objects can include the cube, cone, sphere, cylinder, teapot, walls, floor, and any portions or combinations thereof. A comparison between the cube and the sphere in FIGS. 1A and 1C shows the lighting correction made in FIG. 1C implemented as a color correction of the objects. In FIG. 1D, a scoping light specifies an area in the scene of FIG. 1A, i.e., the area including the cone, cube, and portions of the floor, sphere, and teapot, at which to apply a lighting correction filter. The lighting correction filter is applied to the specified area to correct the area's lighting by correcting the scene colors in that area. A comparison between the specific area in FIGS. 1A and 1D shows the lighting correction made in FIG. 1D implemented as color correction in that area.

Figure 2A:
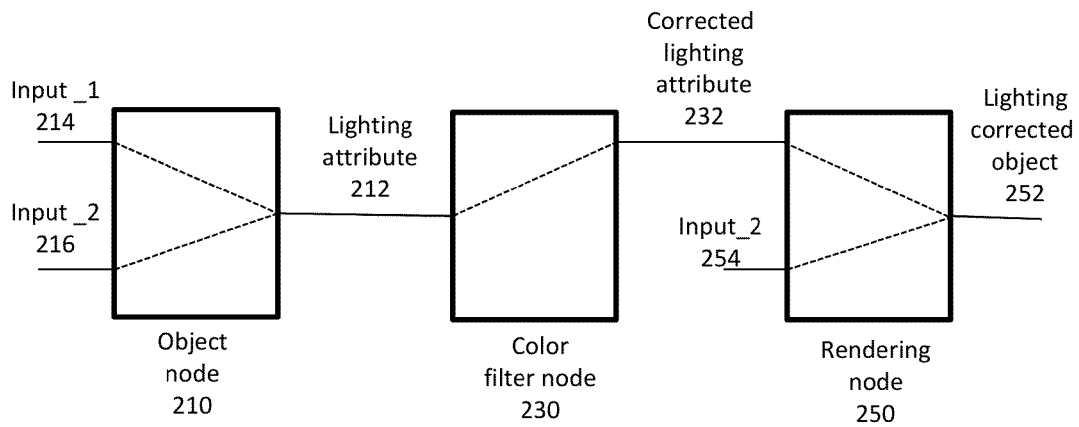
FIGS. 2A and 2B illustrate exemplary portions of render setup graphs having a lighting correction filter as a node.
Figure 2B:
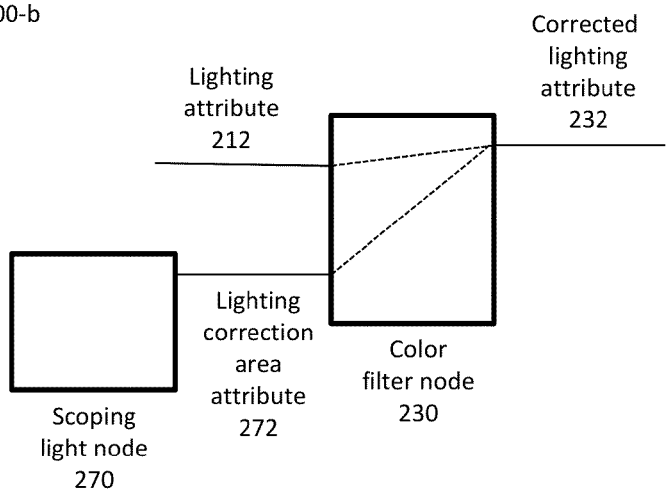

FIGS. 2A and 2B illustrate portions of render setup graphs that can be used to render the scenes of FIGS. 1A through 1D. A render setup graph can define objects and their associated visual effects to be rendered. The graph can typically include one or more nodes associated with the objects and their visual effects including lighting, materials, textures, and the like that can perform logic operations to set up the objects and their visual effects for rendering. The lighting can include one or more light sources and surface shaders to produce a realistic-looking scene. The light sources can be used to illuminate portions of the scene and include, for example, ambient sources, point sources, and spotlights. The surface shaders can be used to simulate the optical properties of the surface of the objects and define the color, texture, specular properties, and other optical characteristics of the objects' surface. An example of a surface shader includes a bidirectional reflectance distribution function (BRDF), which can use the geometry of a planer surface, the location and color of a light source, surface properties, the location of the receiving camera or eye, and the like to simulate how a surface would appear in an actual physical environment. Any suitable technique that simulates a ray of light interacting with surface geometry can be used to implement a surface shader. The graph nodes can be interconnected with node wires that send the object and visual effects attributes as an output from one node to an input to another node for rendering.

In FIG. 2A, render setup graph 200-*a* can include object node 210, which defines the attributes of the object and associated visual effects. The object node 210 can receive inputs 214, 216 to be used to define the attributes. The graph 200-*a* can also include color filter node 230, which sets the lighting corrections to be made to the object's lighting attributes, as illustrated in FIGS. 1B, 1C, and 1D. The filter node 230 can set values of various lighting attributes for correction, including color brightness, contrast, hue, saturation, and the like. Additionally, the filter node 230 can select one or more objects for which to correct the lighting, e.g., as illustrated in FIG. 1C. The default can be a selection of all the objects, i.e., the entire scene, for which to correct the lighting, e.g., as illustrated in FIG. 1B. The graph 200-*a* can connect the outputs of the selected objects' nodes 210 to the inputs of the filter node 230. The filter node 230 can receive the object's lighting attribute 212 from the object node 210 as an input to be corrected by the filter node. The graph 200-*a* can further include rendering node 250, which defines the object rendering. The rendering node 250 can receive the object's lighting attribute 232 corrected by the filter node 230 as well as any other input 254 required to render the object. The rendering node can then output the complete configuration for the object, including its corrected lighting attribute 232, that can be stored or used to create the scenes, as illustrated in FIGS. 1B, 1C, and 1D.

The render setup graph can be displayed on a computer display and manipulated using a graphical user interface and computer I/O hardware, as described in more detail below. The render setup graph is generally configurable by an animator or user and can be used to create multiple lighting scenarios for a scene. The render setup graph can typically accept as input, a set of objects located in object storage. The object storage can typically include a centralized computer-storage database that can be accessed by multiple users. The centralized storage can improve storage efficiency and helps ensure that the scene uses a common revision of the objects.

In FIG. 2B, render setup graph 200-*b* can be similar to render setup graph 200-*a* with the addition of scoping light node 270, which defines a specific area of the object and/or the scene at which to correct the lighting. In the scoping light node 270, geometric attributes can be set to define the area, including (x, y, z) scene coordinates, size, shape, and the like. The scoping light node 270 can send attributes of the specific area 272 to the color filter node 230. The filter node 230 can then use the correction area attribute 272 to set the area at which to apply lighting corrections, as illustrated in FIG. 1D. The filter node 230 can send the object's corrected lighting attribute 232, set for the specific area, to the rendering node 250. In the filter node 230, the scoping light node 270 can be either enabled to set the specific correction area 272 or disabled to default to either the entire object or the entire scene, depending on the object nodes connected to the filter node.

The ability to select and correct the lighting conditions after the objects have been defined allows the animator or user to develop different lighting without having to work on the entire scene or repeat the object creation.

Figure 3:
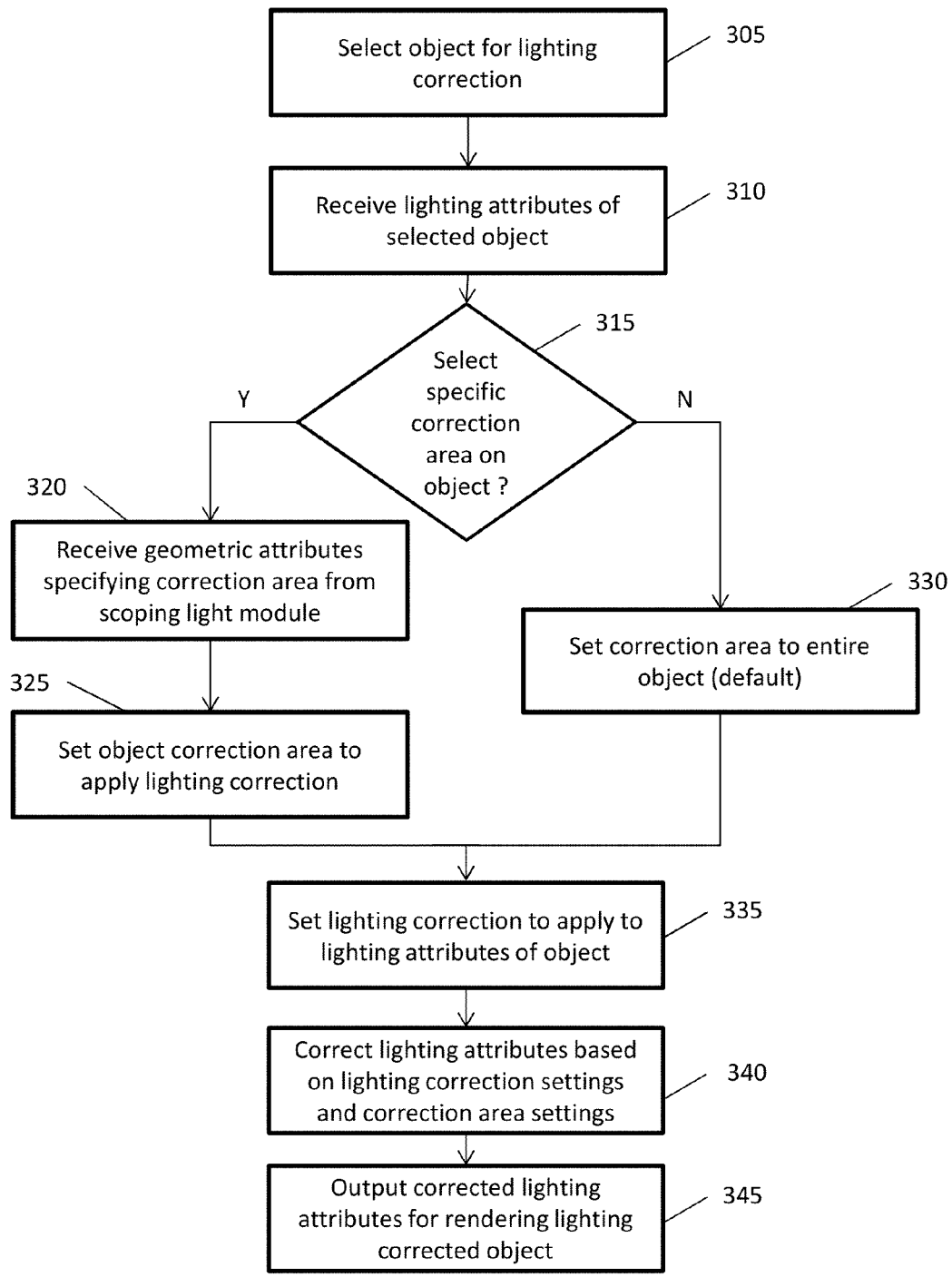
FIG. 3 illustrates an exemplary method for correcting lighting of a computer-generated object by applying a lighting correction filter to the object prior to rendering.

FIG. 3 illustrates an exemplary method for correcting lighting of a computer-generated object by applying a lighting correction filter to the object prior to rendering. In FIG. 3, the lighting correction filter can select one or more computer-generated objects for lighting correction (305). The selected object can be a portion of an object, an entire object, a portion of a scene (multiple objects), or the entire scene (all objects). The lighting correction filter can receive lighting attributes of the selected object(s) as an input (310). For example, the lighting attributes can include the light source used and its lighting properties, the color, texture, specular properties, and other optical characteristics of the lighted objects' surfaces, and the like. Object nodes coupled to the lighting correction filter in a render setup graph can send the lighting attributes to the filter.

A determination can be made whether lighting correction is only needed at a specific area on the selected object (315). If lighting correction is only needed at the specific area (315), the lighting correction filter can receive geometric attributes specifying the correction area as an input (320). For example, the geometric attributes can include (x, y, z) scene coordinates, size, shape, and the like. A scoping light node coupled to the lighting correction filter in a render setup graph can send the geometric attributes to the filter. The lighting correction filter can then set a specific area on the object to correct the lighting (325). If lighting correction is needed for the entire object (315), the lighting correction filter can use the default correction area, i.e., the object's entire surface area (330). In this case, a scoping light node need not be used with the filter.

The lighting correction filter can set the corrections to be made to the lighting attributes of the selected object(s) (335). In FIGS. 1A through 1D, examples of correction settings can include brightness, contrast, hue, and saturation corrections to the colors of the object(s) to effect lighting corrections. Based on the correction settings and the correction area settings, the lighting attributes of the selected object(s) can be corrected (340). The lighting correction filter can output the corrected lighting attributes for rendering the selected object (s) (345). Rendering nodes coupled to the lighting correction filter in a render setup graph can receive the corrected lighting attributed from the filter.

It should be understood that the lighting correction filter is not limited to individual objects, but can correct lighting in an entire scene or select portions thereof. For example, the entire scene (i.e., all objects) can be selected for lighting correction (305) and the lighting attributes of the entire scene inputted to the lighting correction filter (310). A specific area of the scene can be selected for correction (315) and the scene attributes specifying that area inputted and set in the lighting correction filter (320, 325). Alternatively, the entire scene can be the default correction area (330). The lighting corrections can be set for the entire scene (335) and applied along with the correction area settings to the lighting attributes of the scene (340). The corrected lighting attributes can then be rendered to provide the entire scene with the corrected lighting (345).

Figure 4:
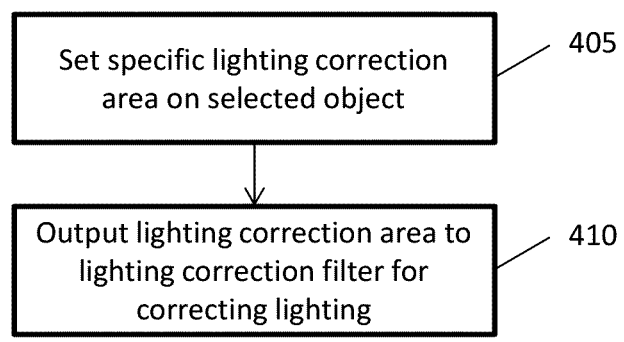
FIG. 4 illustrates an exemplary method for specifying an area of a computer-generated object at which to apply a lighting correction filter.

FIG. 4 illustrates an exemplary method for correcting lighting in a computer-generated object by applying a scoping light to the object prior to rendering. In FIG. 4, the scoping light can set a specific area on a computer-generated object for lighting correction (405). The scoping light can then send the correction area setting to a lighting correction filter to perform the lighting correction, as described in FIG. 3 (410). The setting can be sent in the form of geometric attributes, as described above.

It should be understood that the scoping light is not limited to individual objects, but can specify a lighting correction area in an entire scene or portions thereof. As such, multiple objects can be specified for lighting correction. For example, a specific area in the scene can be set for lighting correction (405) and the setting sent to the lighting correction filter to correct lighting for that area of the scene (410).

Figure 5A:
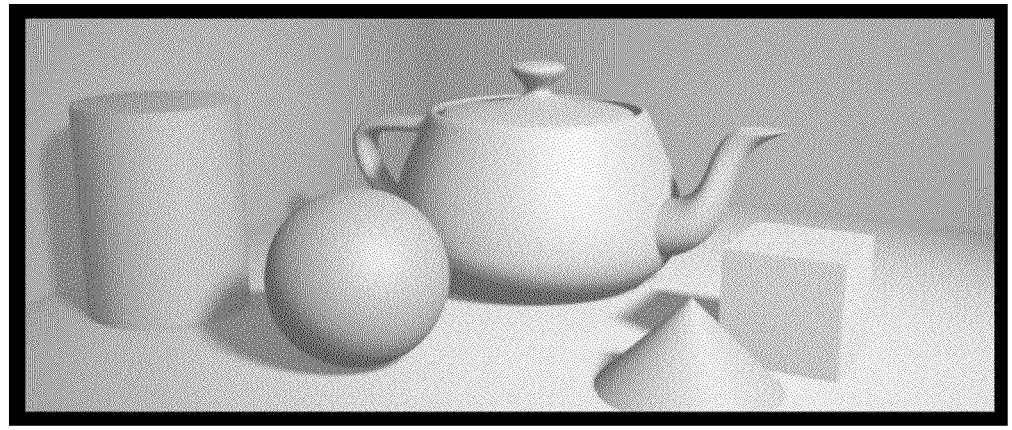
FIGS. 5A through 5D illustrate an exemplary series of rendered scenes that result from applying another lighting correction filter to computer-generated objects in the scenes.
Figure 5B:
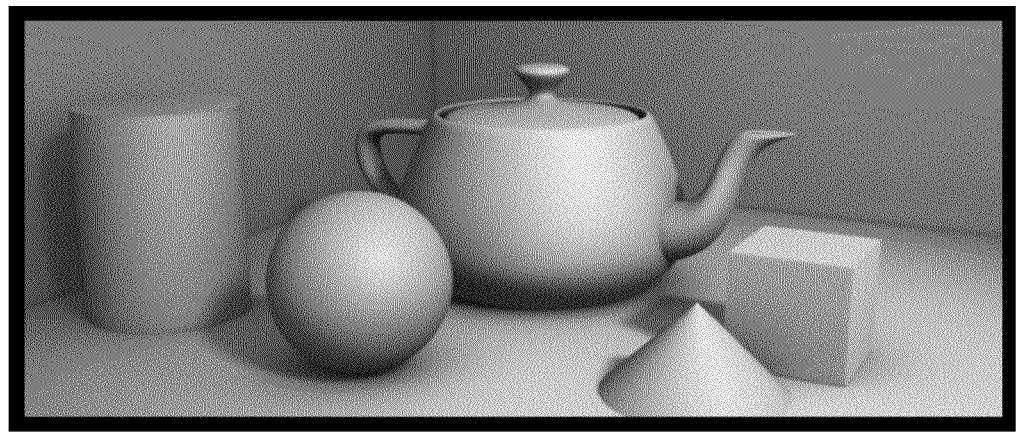
Figure 5C:
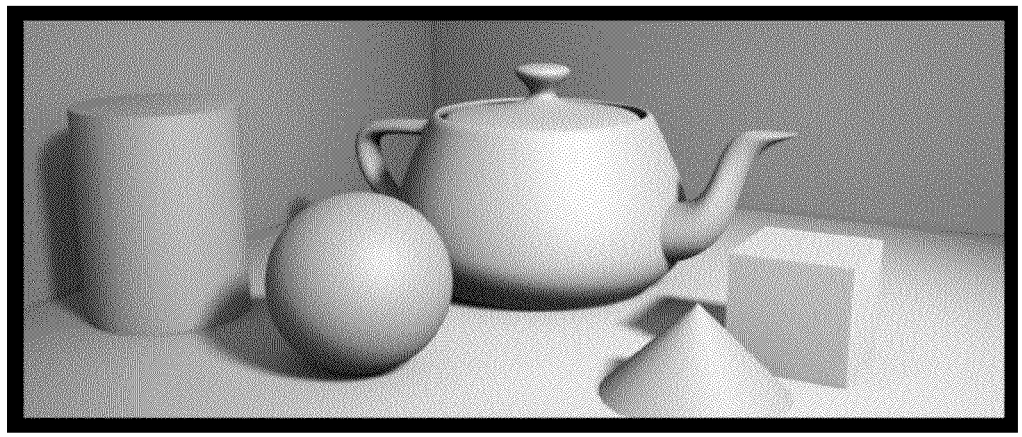
Figure 5D:
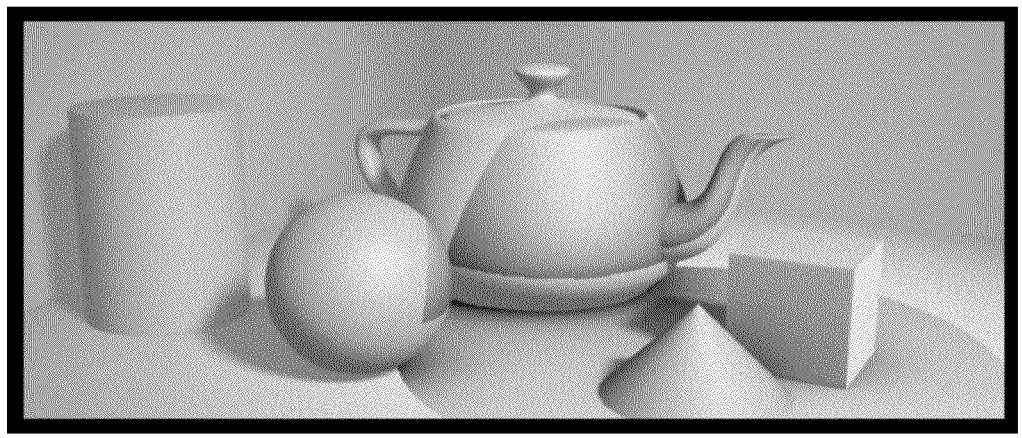

In addition to a color filter to correct post-illumination color in a scene, an exposure filter can be used to correct occlusion shading in the scene. Occlusion can be described as, given a broad, perhaps, diffuse source of illumination, an effect in which the amount of illumination at a given location in the scene is a function of that location's proximity to other geometry in the scene. This is similar to how a shadow is cast by geometry based on its proximity to a given light source. The exposure filter can apply this occlusion effect to an object in the scene. FIGS. 5A through 5D illustrate exemplary scenes from an animation rendered using the method for selectively correcting lighting in the scenes as described above. In FIG. 5A, a scene is rendered without any lighting correction. In FIG. 5B, a lighting correction filter is applied to the scene of FIG. 5A to correct the occlusion shading of the entire scene by a change or addition of the shading. A comparison between FIGS. 5A and 5B shows the occlusion shading correction made in FIG. 5B. In FIG. 5C, a lighting correction filter is applied to select objects in the scene of FIG. 5A to correct the occlusion shading of the selected objects. Here, the selected objects are the shaded areas made from shadows cast by the sphere, cone, cube, sphere, and teapot. A comparison between the shaded areas in FIGS. 5A and 5C shows the occlusion shading correction made in FIG. 5C. In FIG. 5D, a scoping light specifies an area in the scene of FIG. 5A, i.e., the area including the cone, cube, and portions of the floor, sphere, and teapot, at which to apply a lighting correction filter. The lighting correction filter is applied to the specific area to correct the area's occlusion shading. A comparison between the specific area in FIGS. 5A and 5D shows the occlusion shading correction made in FIG. 5D.

Figure 6A:
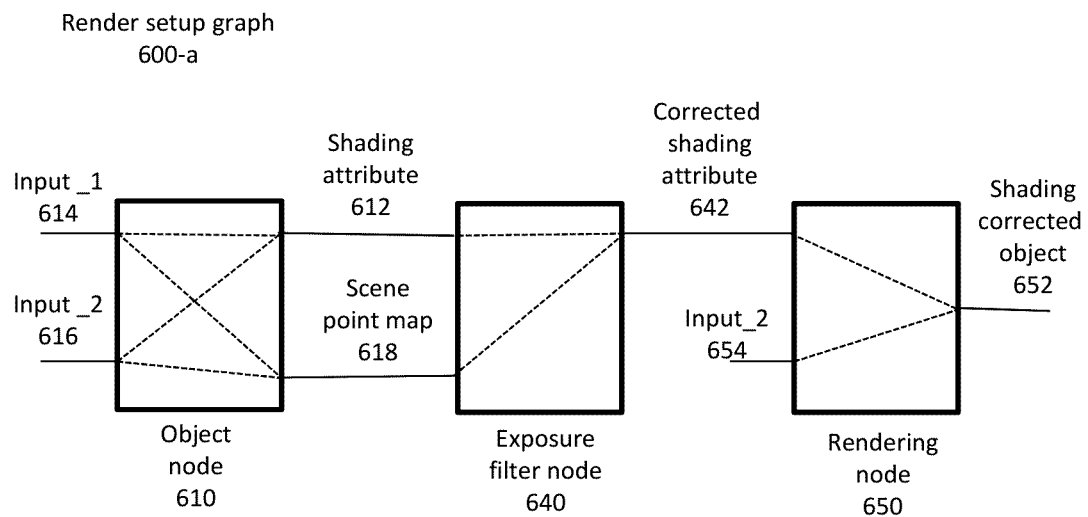
FIGS. 6A and 6B illustrate exemplary portions of render setup graphs having another lighting correction filter as a node.
Figure 6B:
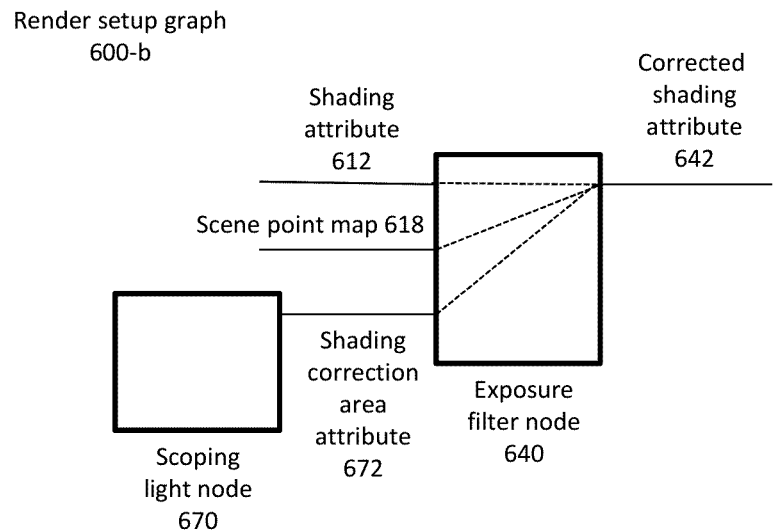

FIGS. 6A and 6B illustrate portions of render setup graphs that can be used to render the scenes of FIGS. 5A through 5D. In FIG. 6A, render setup graph 600-a can include object node 610, which defines the attributes of the object and associated visual effects. The object node 610 can receive inputs 614, 616 to be used to define the attributes. The graph 600-a can also include exposure filter node 640, which sets the occlusion shading corrections to be made to the object's shading attributes, as illustrated in FIGS. 5B, 5C, and 5D. The filter node 640 can set values of various shading attributes for correction, including intensity magnitude, intensity bias, intensity gain, and the like. Additionally, the filter node 640 can select one or more objects on which to correct the occlusion shading, e.g., as illustrated in FIG. 5C. The graph 200-a can connect the outputs of the selected objects' nodes 610 to the inputs of the filter node 640. The filter node 640 can receive the object's shading attribute 612 from the object node 610 as an input. The filter node 640 can also receive a 3D point scene map 618, which can be any arbitrary set of geometry selected from the total set of geometry defined in the scene, as another input. The scene map 618 can be used to help define the 3D geometry of the objects casting the shadows. The graph 600-a can further include rendering node 650, which defines the object rendering. The rendering node 650 can receive the object's shading attribute 632 corrected by the filter node 640 as well as any other input 654 required to render the object. The rendering node can then output the complete configuration for the object, including its corrected shading attribute, that can be stored or used to create the scenes, as illustrated in FIGS. 5B, 5C, and 5D.

In FIG. 6B, render setup graph 600-b can be similar to render setup graph 600-a with the addition of scoping light node 670, which defines a specific area of the object and/or the scene at which to correct the occlusion shading. In the scoping light node 670, geometric attributes can be set to define the area, including (x, y, z) scene coordinates, size, shape, and the like. The scoping light node 670 can send attributes of the specific area 672 to the exposure filter node 640. The filter node 640 can then use the correction area attribute 672 to set the area at which to apply occlusion shading corrections, as illustrated in FIG. 5D. The filter node 640 can send the object's corrected shading attribute 632, set for the specific area, to the rendering node 650. In the filter node 640, the scoping light node 670 can be either enabled to set the specific correction area 672 or disabled to default to either the entire object or the entire scene, depending on the object nodes connected to the filter node.

Figure 7A:
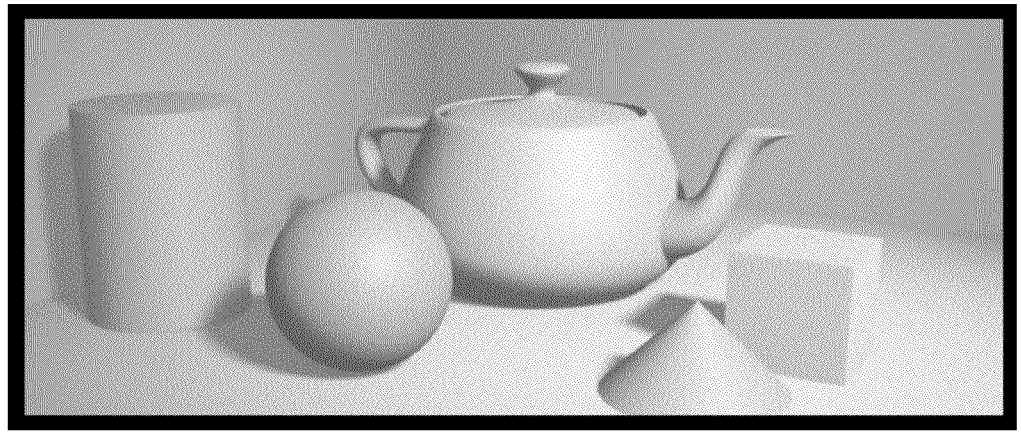
FIGS. 7A and 7B illustrate an exemplary series of rendered scenes that result from applying multiple lighting correction filters to computer-generated objects in the scenes.
Figure 7B:
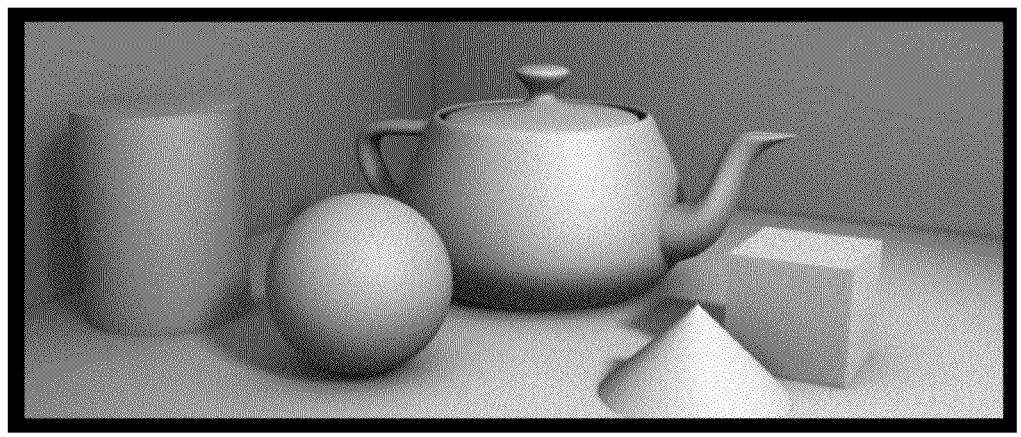

Multiple lighting correction filters can be used to correct lighting in a computer-generated scene. FIGS. 7A and 7B illustrate exemplary scenes from an animation rendered using the method for selectively correcting lighting in the scenes as described above. In FIG. 7A, a scene is rendered without any lighting correction. In FIG. 7B, a first lighting correction filter is applied to the scene of FIG. 7A to correct the lighting in the scene, followed by a second lighting correction filter applied to the results of the first lighting correction to further correct the lighting in the scene. Here, the first filter is a color filter to correct lighting by correcting the scene's colors. The second filter is an exposure filter to further correct lighting by correcting the scene's occlusion shading. A comparison between FIGS. 7A and 7B shows the lighting corrections made in FIG. 7B. Though not shown, one or more objects in the scene can be selected by the filters and lighting corrections applied thereto. Similarly, though not shown, a scoping light can be coupled with either or both filters to specify an area in the scene at which to make the lighting corrections. It should be understood that the filters can be applied in any order according to desired lighting corrections.

Figure 8A:
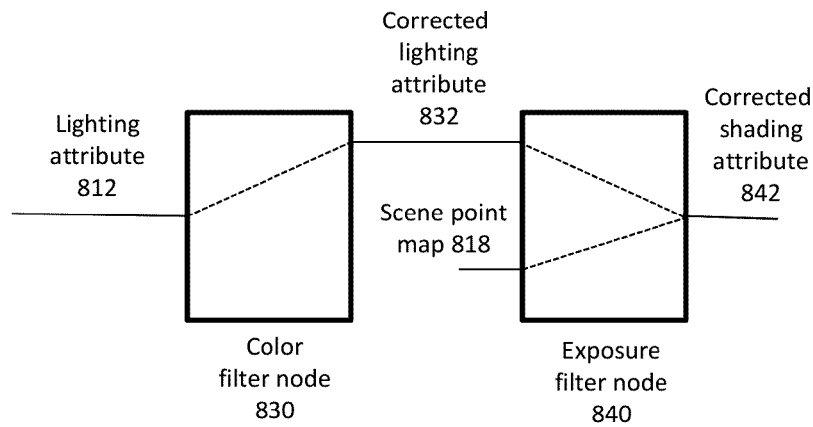
FIGS. 8A and 8B illustrate exemplary portions of render setup graphs having multiple lighting correction filters as nodes.
Figure 8B:
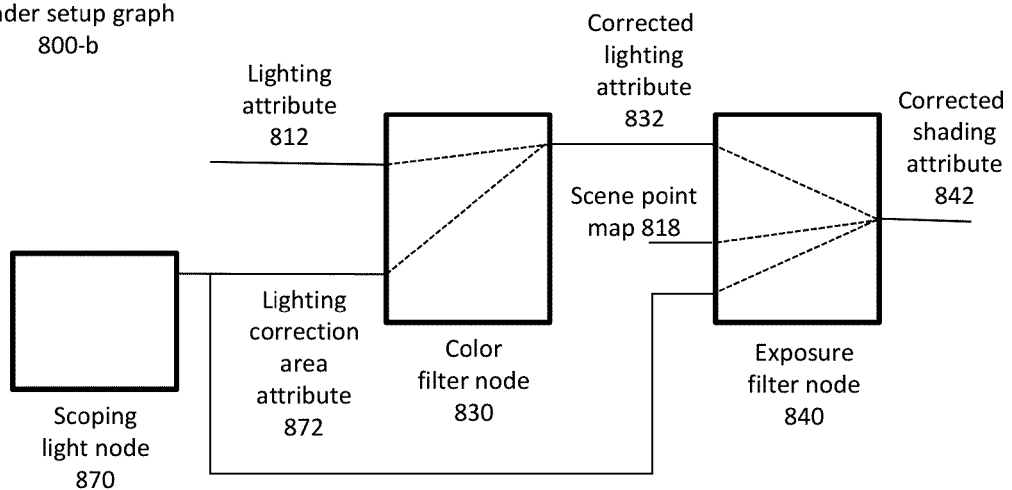

FIGS. 8A and 8B illustrate portions of render setup graphs that can be used to render the scenes of FIGS. 7A and 7B. In FIG. 8A, render setup graph 800-a can include color filter node 830, which sets the lighting corrections to be made to the object's lighting attributes, as illustrated in FIG. 7B. The color filter node 830 can set values of various lighting attributes for correction, including color brightness, contrast, hue, saturation, and the like. Additionally, the color filter node 830 can select one or more objects on which to correct the lighting, e.g., as illustrated in FIG. 7B. The color filter node 830 can receive the object's lighting attribute 812 from an object node (not shown) as an input. The graph 800-a can also include exposure filter node 840, which sets the occlusion shading corrections to be made to the object's shading attributes, as illustrated in FIG. 7B. The exposure filter node 840 can set values of various shading attributes for correction, including intensity magnitude, intensity bias, intensity gain, and the like. Additionally, the exposure filter node 840 can select one or more objects on which to correct the shading, e.g., as illustrated in FIG. 7B. The exposure filter node 840 can receive the object's corrected lighting attribute 832 from the color filter node 830 as an input. The exposure filter node 840 can also receive a 3D point scene map 818 as another input. The exposure filter node 840 can send the object's shading attribute 832 corrected by the filter node 840 to a rendering node (not shown) to output the complete configuration for the object, including its corrected attribute, that can be stored or used to create the scenes, as illustrated in FIG. 7B.

In FIG. 8B, render setup graph 800-b can be similar to render setup graph 800-a with the addition of scoping light node 870, which defines a specific area of the object and/or the scene in which to correct the lighting. The scoping light node 870 can send attributes of the specific area 872 to the color filter node 830 and to the exposure filter node 840. The filter nodes 830, 840 can then use the correction area attribute 872 to set the area in which to apply lighting corrections. The color filter node 830 can send the object's corrected lighting attribute 832, set for the specific area, to the exposure filter node 840 to correct occlusion shading in that area.

Although FIG. 8B illustrates the scoping light node 870 coupled to both filter nodes 830, 840, it should be understood that the scoping light node can be coupled to a single one of the filters to set the area in which to apply that node's lighting corrections. It should further be understood that each filter node 830, 840 can have its own scoping light node 870 with either the same or different areas specified for lighting correction.

Figure 9:
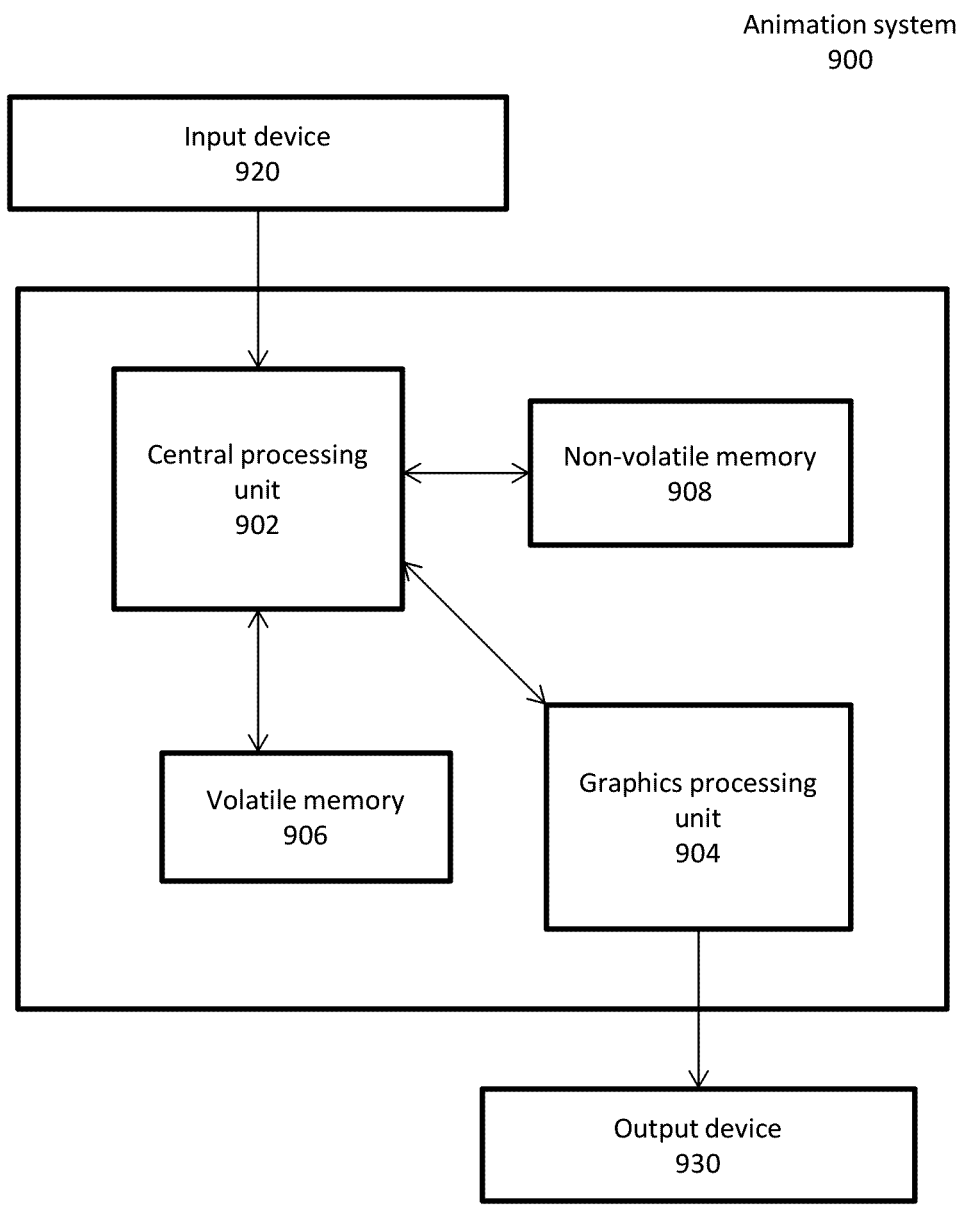
FIG. 9 illustrates an exemplary animation system that uses one or more lighting correction filters to correct lighting of a computer-generated object prior to rendering.

FIG. 9 illustrates an exemplary animation system 900 that can be used to implement the lighting correction filters discussed above. The filters can be implemented, for example, in either hardware or in software stored on a non-transitory computer-readable storage medium. The system can be configured to apply the filters to correct lighting in a computer-generated object, a portion of the object, the computer-generated scene, or a portion of the scene. The system can be further configured to receive input from a user and to display graphics, an image, or scene of an animation based on the light correction.

The animation system 900 can be configured to receive user input from an input device 920. The input device 920 can be any device that receives input from the user and transmits it to the animation system 900. For example, the input device can be a keyboard, a mouse, a tablet, a stylus, or the like. Those skilled in the art will recognize that other types of input devices can also be used.

The animation system 900 can be configured to output graphics, images, or scenes of an animation to a display device 930. The display device 930 can be any device that receives data from the animation system and presents it to the user. For example, the display device can be a liquid crystal display, a set of light emitting diodes, a projector, or the like. Those skilled in the art will recognize that other types of output devices can also be used.

The animation system 900 can comprise a central processing unit 902. The central processing unit can comprise one or more processing cores. The central processing unit 902 can be coupled to and able to communicate with the input device 920. Although the animation system 900 is illustrated with one central processing unit 902, the animation system 900 can have multiple processing units. The animation system 900 can also comprise a graphics processing unit 904. The graphics processing unit 904 can be dedicated to processing graphics related data. The graphics processing unit 904 can comprise a single processing core or multiple processing cores.

Although the animation system 900 is illustrated with one graphics processing unit 904, the animation system 900 can have a plurality of graphics processing units. The central processing unit 902 and/or the graphics processing unit 904 can be coupled to and able to communicate data to the output device 930.

In one example, the animation system 900 can comprise one or more processors and instructions stored in a non-transitory computer readable storage medium, such as a memory or storage device, that when executed by the one or more processors, perform lighting correction using lighting correction filters, as described above. In the context of the embodiments described herein, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The animation system 900 can comprise volatile memory 906, which is a non-transitory computer readable storage medium, in communication with the central processing unit 902. The volatile memory 906 can be, for example, random access memory, such as dynamic random access memory or static random access memory, or any other type of volatile memory. The volatile memory 906 can be used to store data or instructions during the operation of the animation system 900. Those skilled in the art will recognize that other types of volatile memory can also be used.

The animation system 900 can also comprise non-volatile memory 908, which is a non-transitory computer readable storage medium, in communication with the central processing unit 902. The non-volatile memory 908 can include flash memory, hard disks, magnetic storage devices, read-only memory, or the like. The non-volatile memory 908 can be used to store animation data, render setup graph data, computer instructions, or any other information. Those skilled in the art will recognize that other types of non-volatile memory can also be used.

The animation system 900 is not limited to the devices, configurations, and functionalities described above. For example, although a single volatile memory 906, non-volatile memory 908, central processing unit 902, graphics processing unit 904, input device 920, and output device 930 are illustrated, a plurality of any of these devices can be implemented internal or external to the animation system 900. In addition, the animation system 900 can comprise a network access device for accessing information on a network, such as an internal network or the Internet. Those skilled in the art will recognize other configurations of the animation system 900 can be used.

Various exemplary embodiments are described herein. Reference is made to these examples in a non-limiting sense. They are provided to illustrate more broadly applicable aspects of the disclosed technology. Various changes can be made and equivalents can be substituted without departing from the true spirit and scope of the various embodiments. In addition, many modifications can be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which can be readily separated from or combined with the features of any of the other several embodiments without departing from the scope or spirit of the various embodiments.

What is claimed is:

1. A computer-implemented method for performing selective lighting correction in computer animation, the method comprising:
    accessing, by one or more processors, a render setup graph, the graph comprising a plurality of interconnected nodes, at least one of the nodes being a lighting correction filter node for correcting lighting of a computer-generated object, and at least one of the nodes being an object node representing the computer-generated object, and wherein the lighting correction filter node is coupled directly to the object node in the render setup graph;
    selecting, by the one or more processors, the computer-generated object represented by the object node coupled directly to the lighting correction filter node, the computer generated object having a lighting attribute;
    setting, by the one or more processors, in the lighting correction filter node lighting correction values for the lighting attribute of the selected object;
    applying, by the one or more processors, the set lighting correction values in the lighting correction filter node to the lighting attribute prior to rendering the selected object; and
    rendering the selected object with the corrected lighting attribute.

2. The method of claim 1, wherein selecting the object comprises selecting at least one of a portion of an object, an entire object, a portion of a scene, or an entire scene.

3. The method of claim 1, wherein setting the lighting correction values comprises setting at least one color parameter for the lighting attribute, the at least one color parameter including brightness, contrast, hue, or saturation.

4. The method of claim 1, wherein setting the lighting correction values comprises setting at least one exposure parameter for the lighting attribute, the at least one exposure parameter including intensity magnitude, bias, or gain.

5. The method of claim 1, wherein applying the set lighting correction values comprises applying at least one color parameter to the lighting attribute to adjust the lighting attribute so as to effect a lighting correction for the selected object.

6. The method of claim 1, wherein applying the set lighting correction values comprises applying at least one exposure parameter to the lighting attribute to adjust the lighting attribute so as to effect a lighting correction for the selected object.

7. The method of claim 1, further comprising:
    specifying, by the one or more processors, an area of the selected object at which to apply the set lighting correction values; and
    applying, by the one or more processors, the set lighting correction values in the specified area.

8. The method of claim 1, further comprising:
    outputting the corrected lighting attribute for rendering the selected object.

9. A non-transitory computer-readable storage medium comprising computer-executable instructions for performing selective lighting correction in computer animation, the computer-executable instructions comprising instructions for:

accessing a render setup graph, the graph comprising a plurality of interconnected nodes, at least one of the nodes being a lighting correction filter node for correcting lighting of a computer-generated object, and at least one of the nodes being an object node representing the computer-generated object, and wherein the lighting correction filter node is coupled directly to the object node in the render setup graph;

selecting the computer-generated object represented by the object node coupled directly to the lighting correction filter node, the computer-generated object having a lighting attribute;

setting in the lighting correction filter node lighting correction values for the lighting attribute of the selected object;

applying the set lighting correction values in the lighting correction filter node to the lighting attribute prior to rendering the selected object; and rendering the selected object with the corrected lighting attribute.

10. The computer-readable storage medium of claim 9, wherein selecting the object comprises selecting at least one of a portion of an object, an entire object, a portion of a scene, or an entire scene.

11. The computer-readable storage medium of claim 9, wherein setting the lighting correction values comprises setting at least one color parameter for the lighting attribute, the at least one color parameter including brightness, contrast, hue, or saturation.

12. The computer-readable storage medium of claim 9, wherein setting the lighting correction values comprises setting at least one exposure parameter for the lighting attribute, the at least one exposure parameter including intensity magnitude, bias, or gain.

13. The computer-readable storage medium of claim 9, wherein applying the set lighting correction values comprises applying at least one color parameter to the lighting attribute to adjust the lighting attribute so as to effect a lighting correction for the selected object.

14. The computer-readable storage medium of claim 9, wherein applying the set lighting correction values comprises applying at least one exposure parameter to the lighting attribute to adjust the lighting attribute so as to effect a lighting correction for the selected object.

15. The computer-readable storage medium of claim 9, further comprising:
specifying an area of the selected object at which to apply the set lighting correction values; and
applying the set lighting correction values in the specified area.

16. The computer-readable storage medium of claim 9, further comprising:
outputting the corrected lighting attribute for rendering the selected object.

17. An apparatus for performing selective lighting correction in computer animation, the apparatus comprising:
a memory configured to store data; and
a computer processor configured to:
access a render setup graph, the graph comprising a plurality of interconnected nodes, at least one of the nodes being a lighting correction filter node for correcting lighting of a computer-generated object, and at least one of the nodes being an object node representing the computer-generated object, and wherein the lighting correction filter node is coupled directly to the object node in the render setup graph;

select the computer generated object represented by the object node coupled directly to the lighting correction filter node, the computer-generated object having a lighting attribute, set in the lighting correction filter node lighting correction values for the lighting attribute of the selected object, apply the set lighting correction values in the lighting correction filter node to the lighting attribute prior to rendering the selected object; and cause an output of the corrected lighting attribute for rendering the selected object.

18. The apparatus of claim 17, wherein the computer processor configured to select the object selects at least one of a portion of an object, an entire object, a portion of a scene, or an entire scene.

19. The apparatus of claim 17, wherein the computer processor configured to set the lighting correction values sets at least one color parameter for the lighting attribute, the at least one color parameter including brightness, contrast, hue, or saturation.

20. The apparatus of claim 17, wherein the computer processor configured to set the lighting correction values sets at least one exposure parameter for the lighting attribute, the at least one exposure parameter including intensity magnitude, bias, or gain.

21. The apparatus of claim 17, wherein the computer processor configured to apply the set lighting correction values applies at least one color parameter to the lighting attribute to adjust the lighting attribute so as to effect a lighting correction for the selected object.

22. The apparatus of claim 17, wherein the computer processor configured to apply the set lighting correction values applies at least one exposure parameter to the lighting attribute to adjust the lighting attribute so as to effect a lighting correction for the selected object.

23. The apparatus of claim 17, wherein the computer processor is further configured to:
specify an area of the selected object at which to apply the set lighting correction values; and
apply the set lighting correction values in the specified area.

24. The apparatus of claim 17, wherein the computer processor is further configured to:
render the selected object with the corrected lighting attribute.

25. A computer-implemented method for performing selective lighting correction in computer animation, the method comprising:
providing, by one or more processors, a render setup graph, the graph including a first node configured to represent a computer-generated object having a lighting attribute, and a second node configured to render the object; and
coupling, by the one or more processors, a third node between an output from the first node and an input to the second node, the third node configured to correct the lighting attribute of the object so as to render the object with the corrected lighting attribute, and wherein the third node is coupled directly to the first node in the render setup graph.

* * * * *